(12) United States Patent
Fausak

(10) Patent No.: US 7,631,173 B2
(45) Date of Patent: Dec. 8, 2009

(54) METHOD AND SYSTEM FOR PERFORMING PRE-BOOT OPERATIONS FROM AN EXTERNAL MEMORY INCLUDING MEMORY ADDRESS AND GEOMETRY

(75) Inventor: Andrew T. Fausak, San Jose, CA (US)

(73) Assignee: Wyse Technology Inc., San Jose, CA (US)

( * ) Notice: Subject to any disclaimer, the term of this patent is extended or adjusted under 35 U.S.C. 154(b) by 416 days.

(21) Appl. No.: 11/074,876

(22) Filed: Mar. 9, 2005

(65) Prior Publication Data

US 2006/0206702 A1    Sep. 14, 2006

(51) Int. Cl.
*G06F 9/24* (2006.01)
*G06F 9/00* (2006.01)
*G06F 11/00* (2006.01)

(52) U.S. Cl. .................................. 713/1; 713/2; 714/36
(58) Field of Classification Search .................. 713/1, 713/2; 709/201–203, 220–222
See application file for complete search history.

(56) References Cited

U.S. PATENT DOCUMENTS

| | | | |
|---|---|---|---|
| 5,948,101 A * | 9/1999 | David et al. | 713/2 |
| 6,055,631 A * | 4/2000 | Chadha | 713/2 |
| 6,598,159 B1 * | 7/2003 | McAlister et al. | 713/2 |
| 6,928,541 B2 * | 8/2005 | Sekiguchi | 713/2 |
| 6,954,853 B2 * | 10/2005 | Wang et al. | 713/2 |
| 7,054,941 B2 * | 5/2006 | Wang | 709/228 |
| 7,257,608 B2 * | 8/2007 | Umeno | 708/250 |
| 2003/0005278 A1 * | 1/2003 | Deng et al. | 713/2 |
| 2004/0236997 A1 * | 11/2004 | Poo | 714/36 |

\* cited by examiner

*Primary Examiner*—Suresh K Suryawanshi
(74) *Attorney, Agent, or Firm*—McDermott Will & Emery LLP

(57) ABSTRACT

A system for booting a computing device with a windowing operating system obtained from an external memory media via an external interface includes an initialization module stored in a read-only memory in the computing device, the module being executed in a processor in the computing device and establishing a data connection to the external memory media through the external interface, and an external device in which the external memory media is disposed, the media storing a windowing operating system image at an external location, and sending the image from the media to the computing device via the external interface in response to a request from the computing device based on memory geometry information of the media, the image being received by the computing device, loaded into a runtime memory in the computing device and then executed by the processor to boot the windowing operating system in the computing device.

33 Claims, 8 Drawing Sheets

METHOD AND SYSTEM FOR PERFORMING PRE-BOOT OPERATIONS FROM AN EXTERNAL MEMORY INCLUDING MEMORY ADDRESS AND GEOMETRY

RELATED APPLICATION

This application is related to U.S. patent application Ser. No. 11/074,875, filed on Mar. 9, 2005, entitled "Operating System Boot From Network Location".

BACKGROUND OF THE INVENTION

1. Field of the Invention

The present invention relates generally to booting a computing device, such as a PC-type computer, with a windowing operating system obtained from an external media device via a connection.

2. Description of the Related Art

Computing devices, such as PC-type computers, contain a processor that executes a windowing operating system (OS), such as Microsoft Windows XP or some other windowing operating system. Such computing devices typically have an external interface capability such as a networking capability or support for other known types of connection such as a USB connection, a FireWire 1334 connection, and the like.

Conventional computing devices operate by booting the windowing OS from a memory media provided in the computing device. For example, a hard disk drive is typically used to store the windowing OS. The initialization boot process then accesses the windowing OS from the local memory media and loads the operating system components, such as the kernel and related files, into random access memory for execution by the processor. Windowing operating systems, such as Windows XP, usually have specific pre-defined requirements for loading the components of the windowing OS into RAM, and these requirements must be complied with to ensure proper boot and operation of the windowing OS.

As the footprint and weight of computing devices becomes smaller, these space and cost savings can be achieved by limiting the resources provided within the computing device. However, resource constraints are limited by the need to provide some form of persistent memory in the computing device with sufficient space to store the windowing operating system. Also, user intervention is usually required to update and manage a windowing operating system stored in a local memory media in a computing device.

Accordingly, it is desirable to develop boot method for a computing device that does not locally store an operating system in a local memory media, but instead loads and boots a "windowing" OS from a remote, external memory media via an external interface, such as a data network or a standardized (USB) serial connection.

SUMMARY OF THE INVENTION

The present invention addresses the foregoing need by providing a method for accessing, loading and booting a "windowing" OS onto a computing device from an external memory media via an external interface connection.

According to one aspect of the invention, the present invention is directed to a system for booting a computing device with a windowing operating system obtained from an external memory media, wherein the system includes an initialization module stored in a read-only memory provided in the computing device, the initialization module being executed in a processor disposed in the computing device and establishing a data connection to the external memory media through the external interface, and an external device in which the external memory media is disposed, the external memory media storing a windowing operating system at an external location, the external device sending the windowing operating system image from the external memory media to the computing device via the external interface in response to a request from the computing device, the request being based on memory geometry information of the external memory media, wherein the windowing operating system image is received by the computing device, loaded into a runtime memory in the computing device and then executed by the processor in order to boot the windowing operating system in the computing device In another embodiment, the invention is method for booting a computing device with a windowing operating system obtained from an external memory media in a server via an external interface, wherein the method includes the steps of establishing a data connection through the external interface to an external location of the external memory media, the external memory media storing a boot agent module and a windowing operating system image at the external location, sending a boot request from the computing device to the external memory media in the server via the data connection, receiving the boot agent module from the server via the data connection in response to the boot request, loading the boot agent module into a runtime memory in the computing device and executing the boot agent module with a processor in the computing device, sending an operating system request from the boot agent module to the external memory media in the server via the data connection, receiving, in response to the operating system request from the boot agent module, the windowing operating system image from the sever via the data connection, and loading the windowing operating system image into the runtime memory and executing the windowing operating system image with the processor.

According to yet another aspect, the invention is directed to method for booting a computing device with a windowing operating system obtained from an external memory media in an external serial device via a serial interface, wherein the method includes the steps of establishing a serial data connection through the serial interface to an external location of the external memory media, the external memory media storing a windowing operating system image at the external location, sending a boot request from the computing device to the external memory media via the serial data connection, detecting, in response to the boot request, a valid boot signature for the external location in the external memory media, sending an operating system request from the computing device to the external memory media via the serial data connection, receiving, in response to the operating system request, the windowing operating system image from the external memory media via the serial data connection, and loading the windowing operating system image into a runtime memory in the computing device and executing the windowing operating system image with a processor in the computing device.

In the network boot embodiment, the external interface is preferably a network interface to a data network, and the initialization module preferably implements a pre-boot execution environment that issues DHCP requests to obtain network configuration information and connection information from the server in order to establish the data connection with the external location in the server. In this embodiment, the boot agent module is obtained via the data connection, and the boot agent module and windowing operating system image are preferably retrieved from the server via a standard connection protocol, such as the internet protocol. In another embodiment, the external interface is preferably a USB connection to a USB memory media, the initialization module preferably establishes the USB connection, and the windowing operating system image is preferably retrieved from the USB memory media via a standard serial (USB) connection protocol. In either embodiment, the windowing operating system image is preferably unpacked in accordance with a predetermined rule set, and sub-portions of the unpacked kernel archive are written to predetermined locations in the runtime memory of the computing device. Also, an initialization record is preferably used to pass a set of arguments and run-time variables to the kernel archive for a proper and efficient boot in the computing device.

In this manner, the present invention allows a computing device to boot a windowing operating system, such as Windows XP, from a remote memory media via a network interface, or from another data interface such as USB, thereby avoiding the need for the computing device to have a large local memory media capable of persistently storing the operating system. This allows computing devices to achieve design and cost savings with respect to local memory resources and the footprint of the computing device. In addition, updates and improvements to the windowing operating system can be more easily managed and stored at the external memory media, for subsequent automatic implementation in the computing device during the next boot-up of the device.

Other and further objects and advantages of the present invention will be further understood and appreciated by those skilled in the art by reference to the following specification, claims, and drawings.

DETAILED DESCRIPTION OF THE INVENTION

As mentioned above, the present invention is generally directed to the accessing, loading and booting of a "windowing" OS in a computing device from a remote location of an external memory media device via an external interface, such as a data network or a standardized serial connection.

Figure 1:
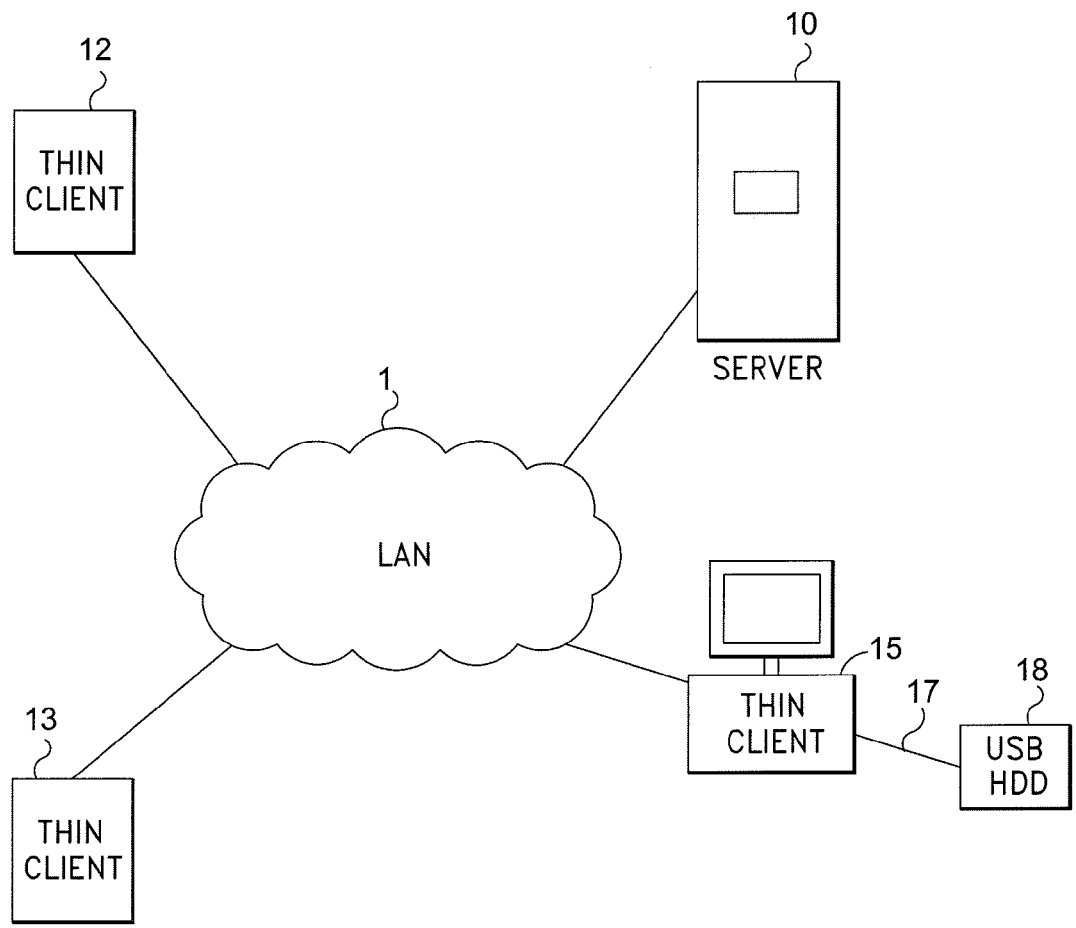
FIG. 1 is a schematic diagram depicting a network environment in which the invention may be practiced according to one embodiment of the present invention.

Turning to the figures, FIG. 1 provides a depiction of a network environment in which the invention may be practiced, although other types of connections can be used between the computing device and the server. As seen in FIG. 1, there is provided large area network (LAN) 1, sever 10 and computing devices 12, 13 and 15. The types of computing devices shown in FIG. 1 are provided for the sake of example, but it should be appreciated that the present invention works with any type of computing device that contains a runtime memory, a processor and that utilizes a windowing-type operating system such as Microsoft Windows XP.

Returning to FIG. 1, LAN 1 is used to provide a data network connection space through which devices 10, 12, 13 and 15 can communicate with one or more other devices. LAN 1 is a typical data network that supports known network connection protocols, such as TCP, IP, DHCP, etc. Computing devices 12 and 13 are thin clients with limited resources that are configured to support specific functionality. For example, thin clients 12 and 13 may be industrial devices which monitor and report on industrial processes via a network connection, either hardwire or wireless. Computing device 15 is configured as a networked PC-type computer for use in a home or a business environment.

Also seen in FIG. 1 is serial connection 17, which is preferably a USB connection, although it can be another type of serial connection. Serial connection 17 connects computing device 15 to an external memory media such as USB hard disk drive (HDD) 18. In this manner, computing device 15 can boot a windowing-type operating system from an external interface other than LAN 1. Accordingly, the present invention allows computing device 15 to boot from either server 10 or USB HDD 18. Although thin clients 12 and 13 are not shown with USB connections in FIG. 1, it should be appreciated that they can have serial connections, such as USB, similar to that of computing device 15.

Figure 2:
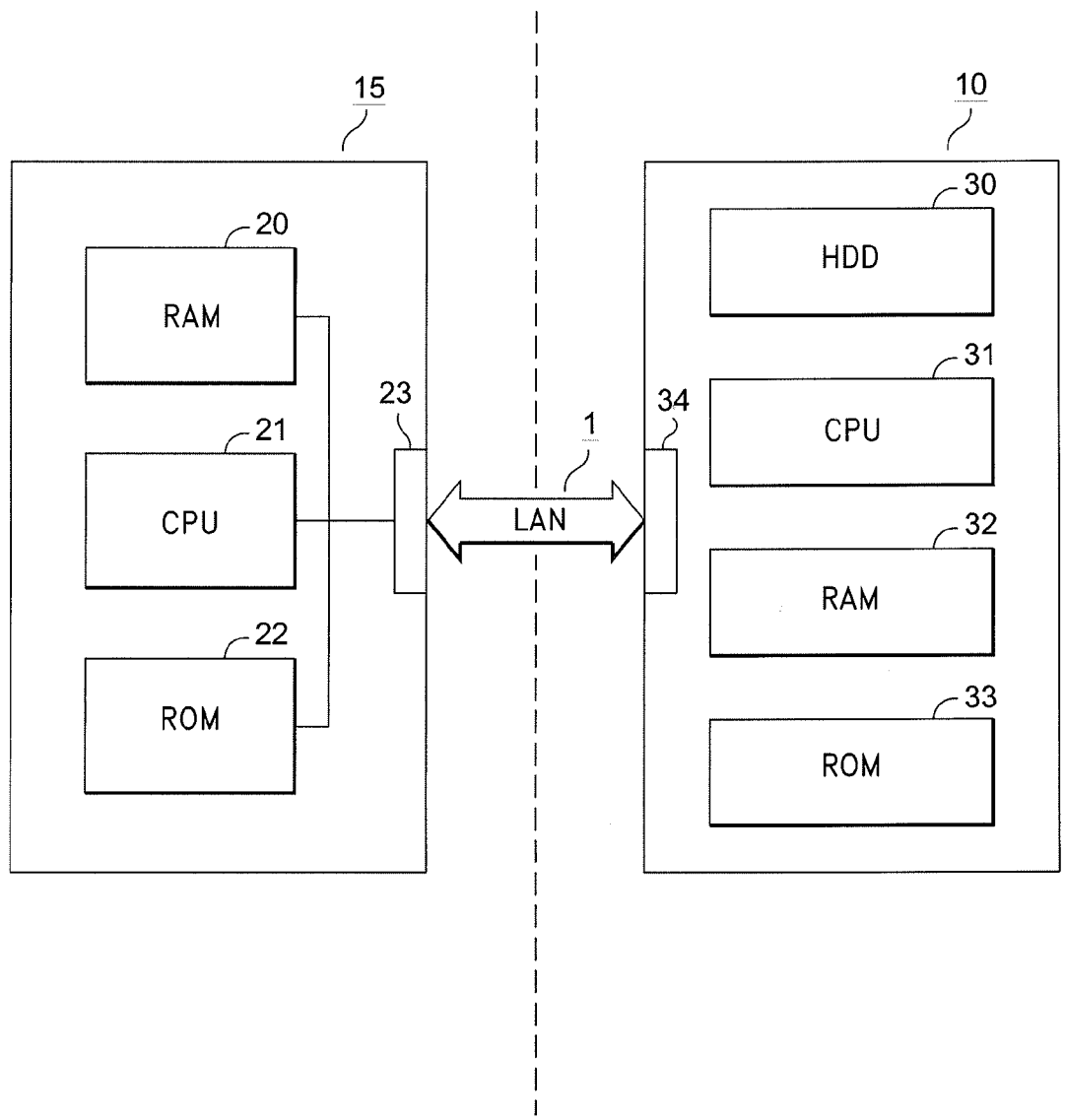
FIG. 2 is a block diagram for illustrating the internal architecture of a computing device and of a server according to according to one embodiment of the present invention.

FIG. 2 depicts the internal architecture of the system components for computing device 15 and server 10 according to one embodiment of the invention. As seen in FIG. 2, computing device 15 and server 10 are able to communicate with each other via LAN 1. Computing device 15 is seen to include random access (runtime) memory (RAM) 20, central processing unit (CPU) 21, read-only (persistent) memory 22, and external interface 23, all of which communicate internally via a bus. RAM 20 is used to load executable code for access by CPU 21 during execution. ROM 22 is a limited-size memory that is used to store a minimal amount of executable data on a persistent basis, such as initialization routines. With the present invention, ROM 22 does not need to be large enough to store an operating system, since the operating system is retrieved from an external location via external interface 23, as discussed more fully below. The contents of ROM 22 are also discussed in more detail below.

External interface 23 shown in FIG. 2 is a network interface for communication via LAN 1, and is either a wireless or hardwire interface. Of course, the invention may be used with other types of connections, such as USB or FireWire, and therefore external interface 23 would instead be an appropriate type of interface for the subject connection, such as a USB interface for connecting to serial connection 17.

Turning to the depiction of server 10 in FIG. 2, it is seen that server 10 includes hard disk drive 30, CPU 31, RAM 32, ROM 33 and external interface 34. Server 10 is a typical server with sufficient hardware resources to be self-sustaining and to support requests from network clients via LAN 1. In this regard, hard disk drive 10 is of sufficient size to store a windowing operating system, application programs, and data files. The contents of hard disk drive 30 are discussed in more detail below. RAM 32 is a runtime memory to store executable code for access and execution by CPU 31, and ROM 33 is a read-only persistent memory for storing executable code, such as initialization routines.

Figure 3:
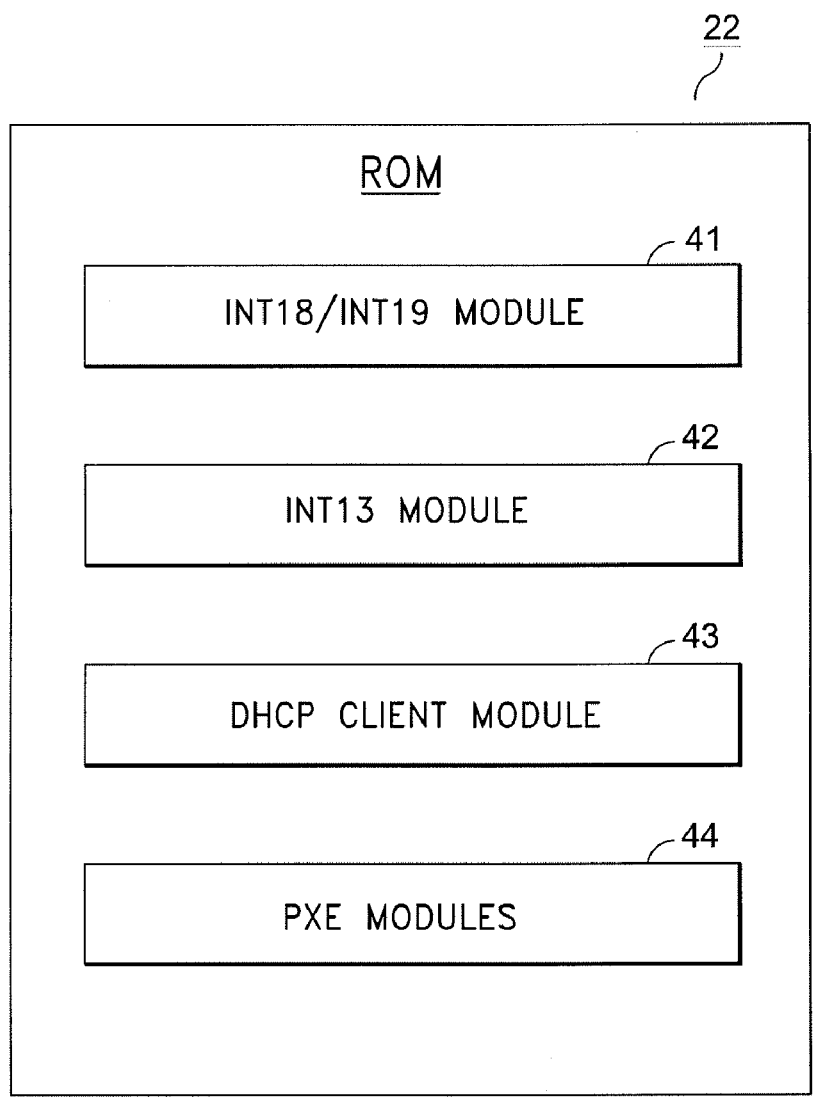
FIG. 3 is a block diagram for illustrating the contents of the read-only memory of the computing device depicted in FIG. 2.

Turning to FIG. 3, the contents of ROM 22 are depicted in more detail. Included in ROM 22 are INT18/INT19 modules 41, INT13 module 42, DHCP client module 43 and PXE modules 44. INT18/INT19 modules 41 are initialization programs that are executed at start-up of computing device 15, and which are used to initiate the functionality of the present invention, as discussed in more detail below. INT13 module 42 is an initialization level program used to read data from a specified location, and is called during the boot process of the present invention, as discussed further below. INT13, INT18/INT19 are generally well known in the personal computer industry and are often referred to as "Logical_Sector_Read/Write", "Increment_current_device_and_Attempt_to-_boot_current_device", and "Restart_system". INT13, INT18/INT19 are real-mode drivers contained in the BIOS for the computing device at first, and later become native protected-mode drivers in the operating system's kernel critical drivers and files, except in the case of RISC-based or other single mode devices. DHCP client module 43 is a dynamic host configuration protocol (DHCP) client that is executed during start-up of computing device 15 to obtain network information, such as a dynamic IP address, from server 10 for configuring external interface 23 of computing device 15. PXE modules 44 are a set of routines that comprise a pre-boot execution environment to support functions required for pre-boot configuration and initialization.

Figure 4:
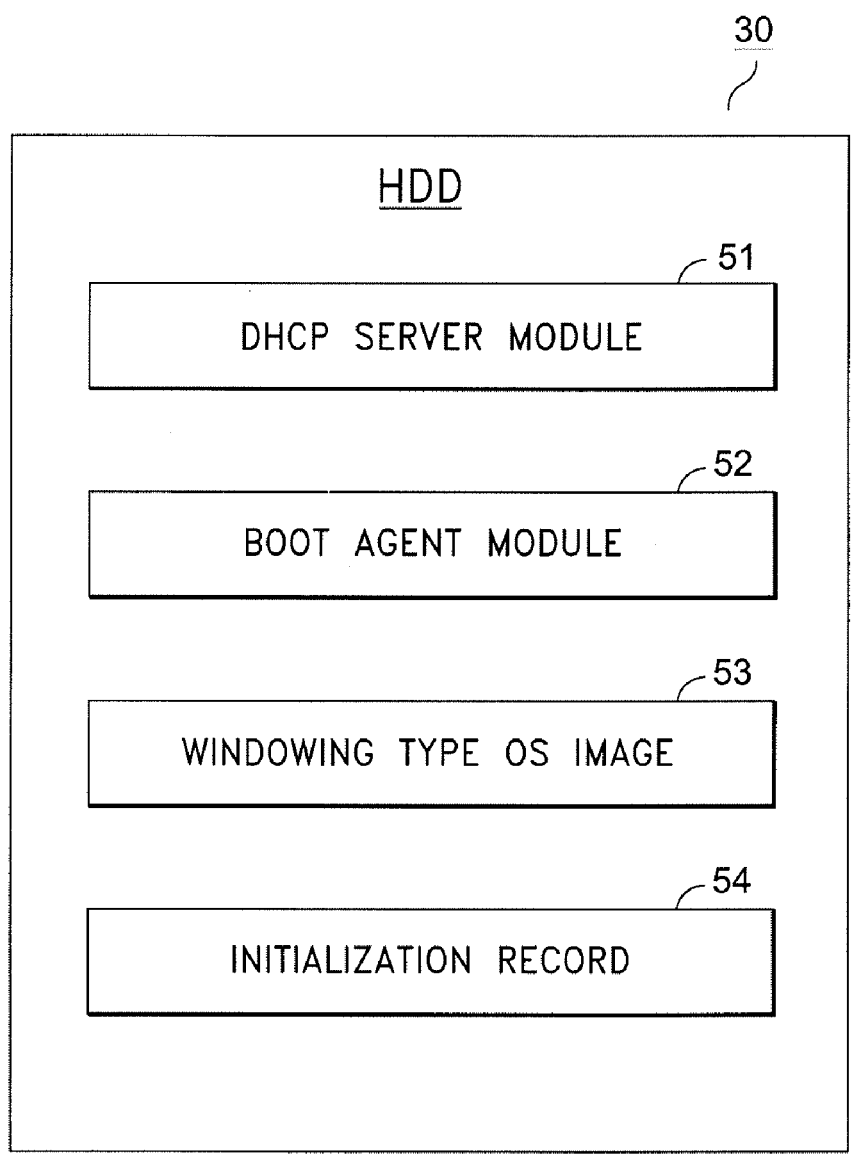
FIG. 4 is a block diagram for illustrating the contents of the hard disk drive of the server depicted in FIG. 2.

In FIG. 4, the contents of hard disk drive 30 of server 10 are shown to include DHCP server module 51, boot agent module 52, windowing operating system (OS) 53, and initialization record 54. DHCP server module 51 provides functionality for server 10 to act as a DHCP server to assign IP addresses to DHCP clients on LAN 1. Boot agent module 52 is a program image that is sent to computing devices, such as computing device 15, in order to implement the present invention, and is discussed in more detail below. Windowing OS image 53 is an image of a windowing-type operating system, such as Microsoft Windows XP, and is retrieved and loaded by a computing device as described more fully below. Windowing OS image 53 comprises a file containing all of the components (kernel image, device drivers, executables, DLLs, etc.) necessary to implement a windowing operating system. Initialization record 54 is a data file that contains arguments and runtime variables for use by windowing OS image 53 when booting in a computing device. In this regard, initialization record 54 is also retrieved for use by a computing device as described further below.

Figure 5:
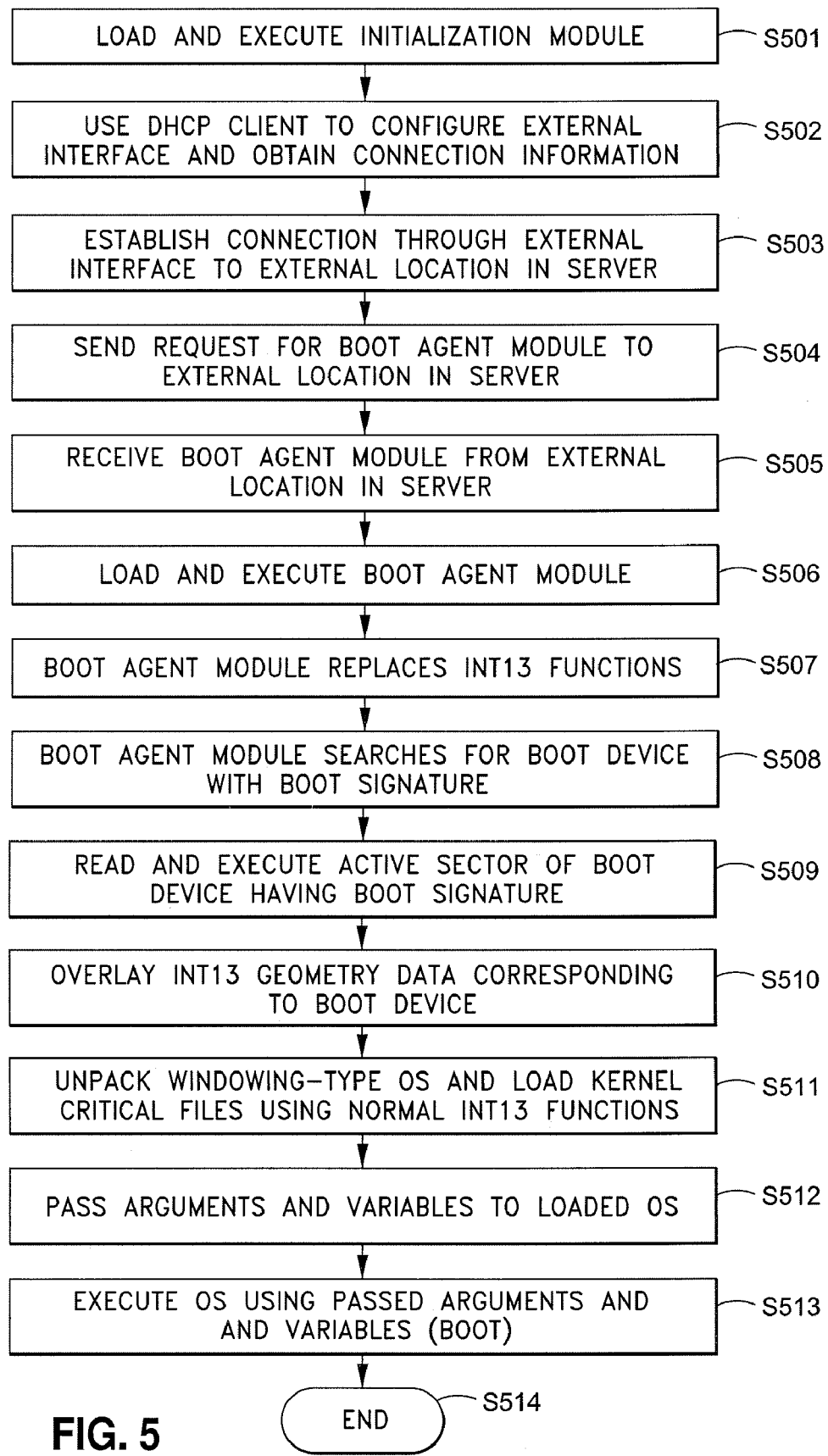
FIG. 5 is a flowchart for explaining the boot of a windowing operating system in a computing device via a network connection according to one embodiment of the present invention.

FIG. 5 is a flowchart for explaining the functionality of the present invention, according to one embodiment in which computing device 15 accesses, loads and executes a windowing-type operating system from server 10 via LAN 1. Turning to FIG. 5, the process begins at step S501, in which INT18 and/or INT19 of INT18/INT19 modules 41 is read from ROM 22 and executed by CPU 21, preferably at start-up or a cycling of power of computing device 15. In this manner, computing device 15 is initialized and configured prior to loading and boot of an operating system. In step S502, DHCP client module 43 is read from ROM 22 and executed by CPU 21 upon which it sends DHCP requests/events over LAN 1 in order to obtain network information and connection information, such as an IP address, from server 10. The received network information is used to configure external interface 23 for network communication. After external interface 23 is configured, a connection is established between computing device 15 and an external location in server 10 via external interface 23 of computing device 15 and external interface 34 of server 10 (step S503).

A request is then sent to the external location on hard disk drive 30 of server 10 to retrieve a copy of boot agent module 52 in step S504. In step S505, boot agent module 52 is sent from server 10 to computing device 15 via external interface 23. Then, in step s506, boot agent module 52 is loaded into RAM 20 and executed by CPU 21 in computing device 15. In step S507, boot agent module 52 replaces the standard INT13 functions that would normally be used to read and/or write to/from the current boot device. Next, boot agent module 52 searches through the possible boot devices for a boot device having a proper boot signature (step S508). In particular, the predetermined list of boot devices is cycled through and the INT13 agent is used to read sector zero of each boot device to check for a valid boot signature. When a boot device, such as hard disk drive 30 of server 10, is found to have a valid boot signature, then sector zero of that boot device is loaded into RAM 20 and executed by CPU 21 (step S509). The INT13 agent then reads the active sector of the boot device, which is then executed, and checked for a valid boot signature in the active sector. If no valid boot signature is found, the search turns to the next possible boot device in the predetermined list.

Once a boot device is found with a valid boot signature in the active sector, the geometry data for the boot device, such as memory size etc., is obtained from the boot device and is overlayed onto the standard geometry data in INT13 (step S510). In this example, the boot device with a valid boot signature is hard disk drive 30 of server 10, and the geometry data of hard disk drive 30 is obtained and overlayed on INT13. Windowing OS image 53 is received by computing device 15 from server 10, and is then unpacked to obtain a kernel archive, and then kernel critical files are loaded into corresponding locations of RAM 20 in computing device 15 using the normal version of INT13 (step S511). In this regard, once the kernel critical files are loaded, they become responsible for the further reading/writing of the logical media, and INT13 is no longer used for this purpose. Accordingly, no secondary or transition drivers are required, despite the fact that INT13 is real-mode and kernel code is protected-mode. The unpacking and loading of portions of the operating system into RAM 20 is performed according to a strict predetermined rule set corresponding to windowing OS image 53.

For proper boot of windowing OS image 53, it will need access to specific arguments and runtime variables which configure the windowing OS to operate properly in computing device 15. In this regard, arguments and runtime variables are obtained by retrieving initialization record 54 from hard disk drive 30 of server 10 using INT13. The arguments and runtime variables are then passed to the loaded portions of windowing OS image 53 in step S512 by loading them into RAM 20 and providing their address locations. Next, in step S513, CPU 21 executes the loaded portions of windowing OS image 53 using the passed arguments and runtime variables. Process control is passed to the executing windowing OS, which is thereby made operational in computing device 15, thereby completing the boot process (step S514).

Figure 6:
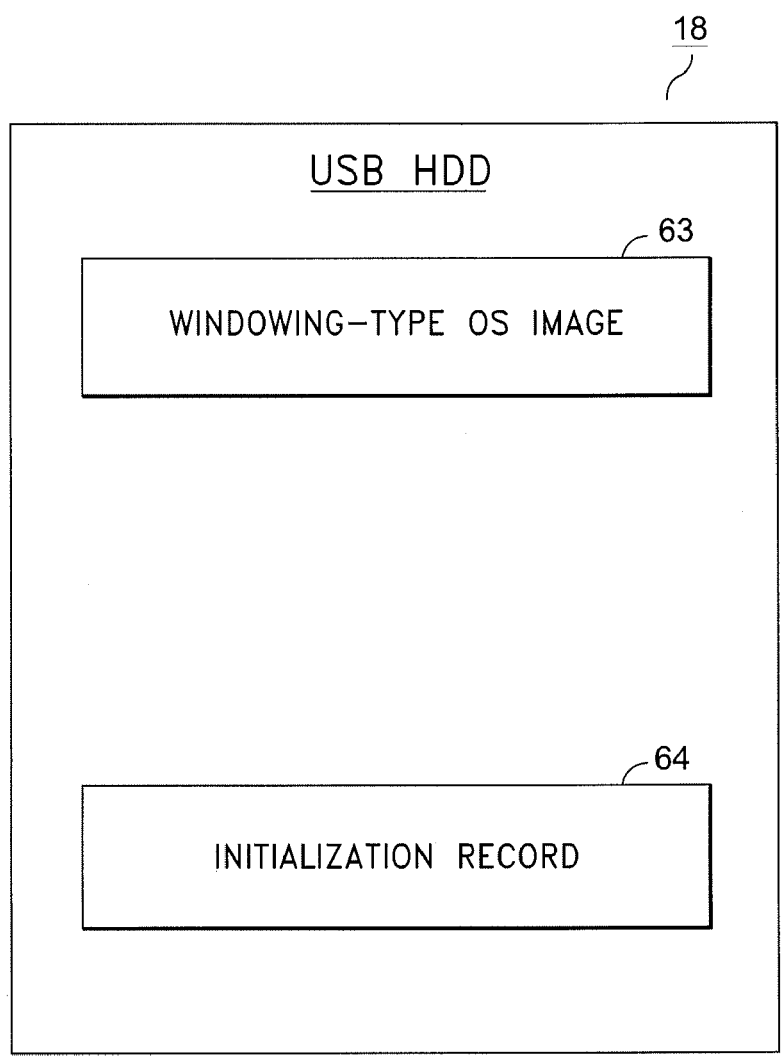
FIG. 6 is a block diagram for illustrating the contents of the USB memory device depicted in FIG. 2.

As mentioned above, the present invention may be practiced in an alternate embodiment in which computing device 15 is booted from a USB memory media, instead of via LAN1. In this regard, FIG. 6 illustrates the contents of USB hard disk drive 18, which is connected to computing device 15 for implementation of a second embodiment of the invention. As seen in FIG. 4, USB HDD 18 is seen to include windowing-type operating system (OS) 63 and initialization record 64. Windowing OS image 63 is an image of a windowing-type operating system, such as Microsoft Windows XP, and is retrieved and loaded by computing device 15 as described more fully below. Windowing OS image 63 comprises a file containing all of the components (kernel image, device drivers, executables, DLLs, etc.) necessary to implement a windowing operating system. Initialization record 64 is a data file that contains arguments and runtime variables for use by windowing OS image 63 when booting in a computing device. In this regard, initialization record 64 is also retrieved for use by a computing device as described further below.

Figure 7:
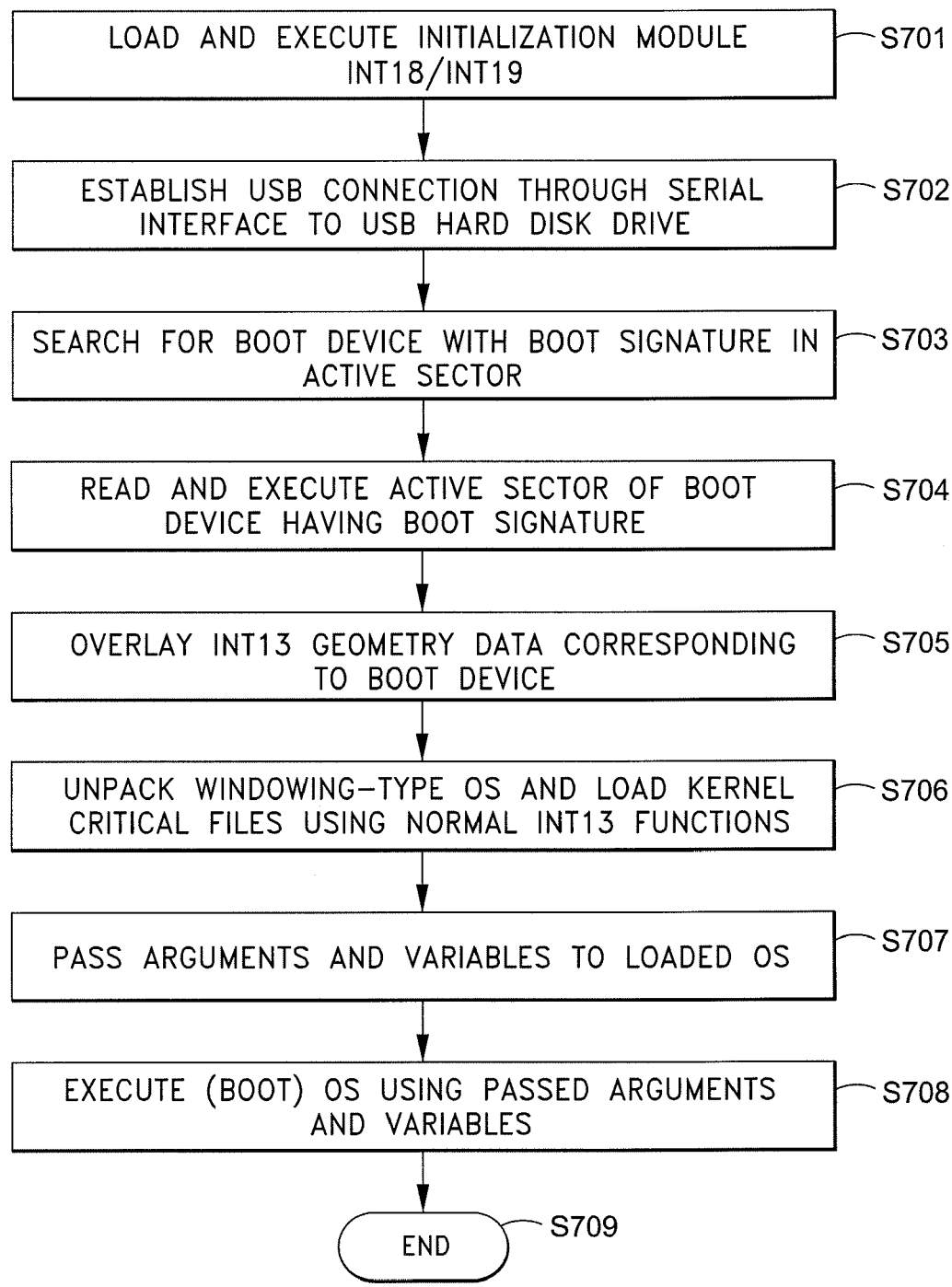
FIG. 7 is a flowchart for explaining the boot of a windowing operating system in a computing device via a USB connection according to a second embodiment of the present invention.

The second embodiment is now described in which computing device 15 is booted with windowing OS image 63 from USB HDD 18. Turning to FIG. 7, the process of this embodiment begins at step S701, in which INT18 and/or INT19 of INT18/INT19 modules 41 is read from ROM 22 and executed by CPU 21, preferably at start-up or a cycling of power of computing device 15. In this manner, computing device 15 is initialized and configured prior to loading and boot of an operating system. In step S702, a USB connection is established between computing device 15 and USB HDD 18 via external interface 23 of computing device 15 over USB connection 17.

Next, a list of possible boot devices is searched for a boot device having a proper boot signature (step S703). In particular, the predetermined list of boot devices is cycled through and the INT13 agent is used to read sector zero of each boot device to check for a valid boot signature. When a boot device, such as USB HDD 18, is found to have a valid boot signature, then sector zero of that boot device is loaded into RAM 20 and executed by CPU 21. INT13 then reads the active sector of the boot device, which is executed, and checked for a valid boot signature in the active sector (step S704). If no valid boot signature is found, the search turns to the next possible boot device in the predetermined list.

Once a boot device is found with a valid boot signature in the active sector, the geometry data for the boot device, such as memory size etc., is obtained from the boot device and is overlayed onto the standard geometry data in INT13 (step S705). In this example, the boot device with a valid boot signature is USB HDD 18, and the geometry data of USB HDD 18 is obtained and overlayed on INT13. Windowing OS image 63 is received by computing device 15 from USB HDD 18, and is unpacked to obtain a kernel archive, and then kernel critical files are loaded into corresponding locations of RAM 20 in computing device 15 using the normal version of INT13 (step S706). In this regard, once the kernel critical files are loaded, they become responsible for the further reading/writing of the logical media, and INT13 is no longer used for this purpose. Accordingly, no secondary or transition drivers are required, despite the fact that INT13 is real-mode and kernel code is protected-mode. The unpacking and loading of portions of windowing operating system 63 into RAM 20 is performed according to a strict predetermined rule set corresponding to windowing OS 63.

For proper boot of windowing OS image 63, it will need access to specific arguments and runtime variables necessary to configure the OS to operate properly in computing device 15. In this regard, arguments and runtime variables are obtained by retrieving initialization record 64 from USB HDD 18 using INT13. The arguments and runtime variables are then passed to the loaded portions of windowing OS image 63 in step S707 by loading them into RAM 20 and providing their address locations. Next, in step S708, CPU 21 executes the loaded portions of windowing OS image 63 using the passed arguments and runtime variables. Process control is passed to the executing windowing OS, which is now operational in computing device 15, thereby completing the boot process (step S709).

In another embodiment of the invention, the boot process can be made more efficient by first collectively loading all needed operating system data into memory before executing the initialization portion of the operating system. In this manner, specialized drivers are not needed to enable the operating system to operate over a specific type of medium, such as a LAN or a USB connection. In this embodiment, the operating system data, such as arguments and runtime variables are treated as a class object, and the boot process is treated as a class. By loading the class object first into memory before performing the class, the normal drivers can be used with the data in the class object to operate the operating system from the desired medium.

Figure 8:
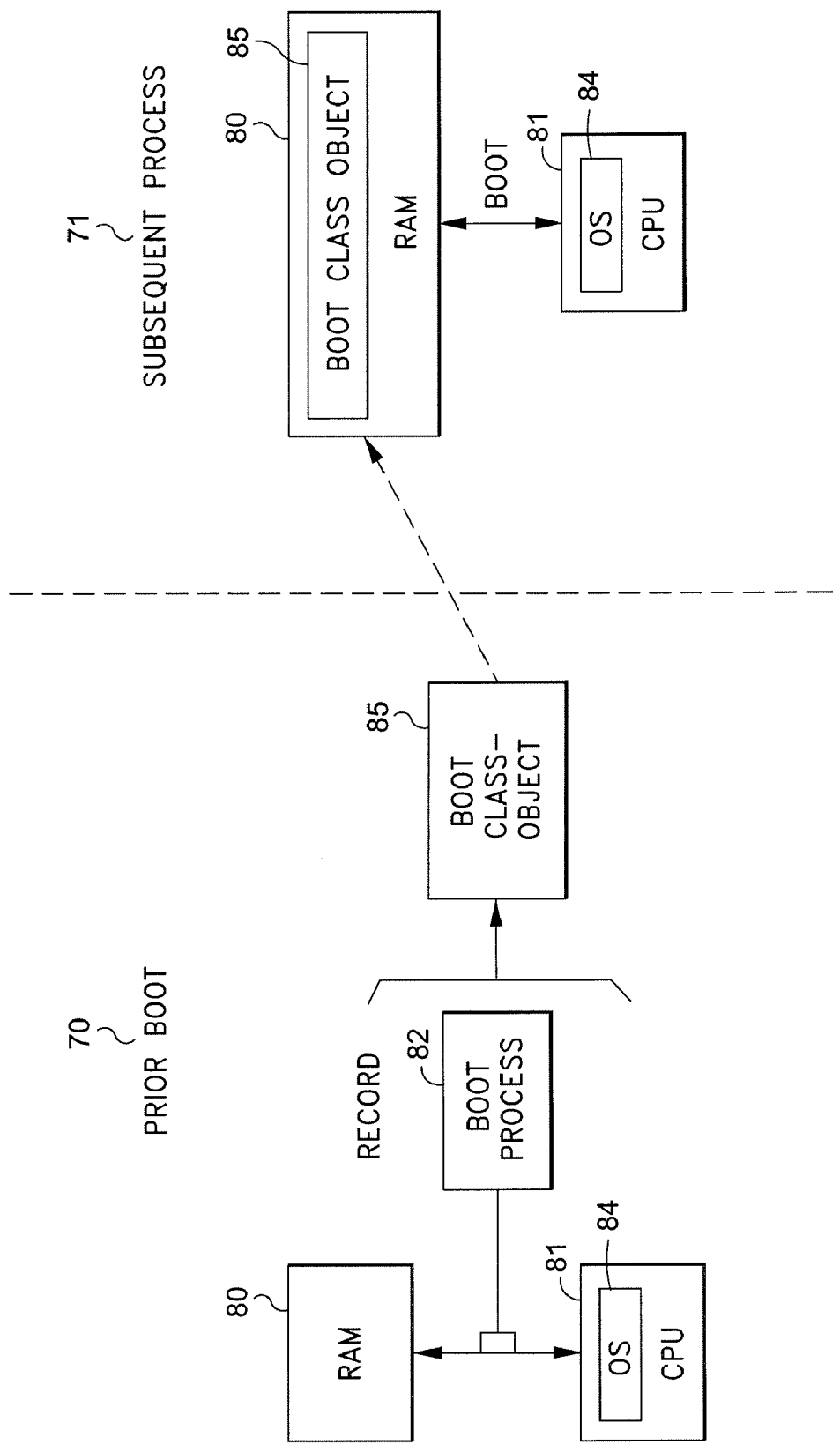
FIG. 8 is a block diagram depicting a technique for booting a windowing operating system according to a third embodiment of the present invention.

This embodiment is depicted in FIG. 8, which depicts two boot processes that are temporally separate from each other. In particular, prior boot process 70 is shown in which a boot process is recorded to capture the necessary arguments and runtime variables for booting the operating system over the particular boot medium, such as server 10 via LAN 1, or such as USB HDD 18 via USB connection 17. In prior boot process 70, it can be seen that the interaction of boot process 82 of windowing operating system 84 by RAM 80 and CPU 81, such as steps 501 to 514 of FIG. 5, is recorded to capture the arguments and runtime variables that are used during prior boot process 70. These captured arguments and runtime variables are stored in boot class object 85. Then, in subsequent boot process 71, boot class object 85 is loaded into RAM 80 for access during the boot process of windowing operating system 84 by CPU 81. In this manner, the arguments and runtime variables needed to boot from the particular medium, such as LAN1 or USB connection 17, are pre-recorded and provided to the operating system during its initialization, thereby allowing the use of normal drivers with the required arguments and variables so that they function properly for access to and from the boot medium.

By the foregoing description and related drawings, it can be appreciated that the present invention provides functionality to boot a computing device with a windowing operating system, such as Windows XP, from a remote memory media via an external data connection, such as a network interface or a USB connection. The present invention thereby avoids the need for the computing device to have sufficient local memory space to persistently store the operating system. This allows computing devices to achieve design and cost savings with respect to the local memory resources and the footprint of the computing device. In addition, updates and improvements to the windowing operating system can be more easily managed and stored in the server, for subsequent automatic implementation in the computing device at boot-up of the device.

The foregoing description of the of the invention has been presented for the purposes of illustration and description, and is not intended to be exhaustive or to limit the scope of the invention to the precise embodiments disclosed herein. It should be appreciated that many modifications, variations and other embodiments of the invention are possible in view of the foregoing description, without departing from the scope or spirit of the invention.

What is claimed is:

1. A computing device configured to boot a windowing operating system obtained from an external memory media via an external interface, the system comprising:

a read-only memory module including an initialization module configured to establish a data connection to the external memory media through the external interface;

the external interface configured to receive a boot agent module and an image of the windowing operating system from an external device in which the external memory media is disposed; and a processor configured to execute the initialization module in order to establish the data connection to the external memory media, receive the boot agent module from the external memory media in response to a request from the initialization module, execute the boot agent module in order to send an operating system request to the external memory media, the operating system request including a memory address location based on memory geometry information of the external memory media, load the windowing operating system image from an external location in the external memory media into a runtime memory, and execute the windowing operating system image in order to boot the windowing operating system.

2. The computing device of claim 1, wherein the external device is a server and the data connection is a network connection.

3. The computing device of claim 1, wherein execution of the initialization module is initiated by a start-up operation of the computing device.

4. The computing device of claim 2, wherein the connection through the external interface to the external location in the server is established by a DHCP request to the server from the external interface.

5. The computing device of claim 4, wherein the computing device configures the external interface based on a response to the DHCP request from the server, and the data connection is established by using connection information received from the server in response to a DHCP event sent from the initialization module to the server via the external interface.

6. The computing device of claim 1, wherein the boot agent module and the windowing operating system image are received from the external location in the server via the data connection through the external interface using a standard data connection protocol.

7. The computing device of claim 6, wherein the external interface is a network interface and the standard connection protocol is an internet protocol, and wherein the computing device and the server are connected to a network.

8. The computing device of claim 1, wherein the windowing operating system image is received by the computing device in response to a request from the boot agent module to the server, and the windowing operating system image is loaded into the runtime memory by unpacking the windowing operating system image in accordance with a predetermined rule set, and writing particular sub-portions of a kernel archive unpacked from the windowing operating system image to corresponding predetermined locations in the runtime memory.

9. The computing device of claim 8, wherein, once the sub-portions of the kernel archive are written into the runtime memory, a set of arguments and run-time variables, along with process control, are passed to the kernel archive as the kernel archive is executed by the processor.

10. The computing device of claim 9, wherein an initialization record is used to pass the set of arguments and run-time variables to the kernel archive, which is loaded in the runtime memory.

11. The computing device of claim 1, wherein the initialization module is a part of a preboot execution environment supported by the processor.

12. The computing device of claim 1, wherein the initialization module is configured to send the request for the windowing operating system to the external memory media via the external interface if the initialization module detects a valid boot signature at the external location of the external memory media.

13. The computing device of claim 1, wherein the external device is a universal serial bus (USB) hard disk drive and wherein the data connection is a USB connection.

14. The computing device of claim 13, wherein the windowing operating system image is received by the computing device in response to a read request from the computing device to the USB hard disk drive, and wherein the windowing operating system image is loaded into the runtime memory by unpacking the windowing operating system image in accordance with a predetermined rule set, and writing particular sub-portions of a kernel archive unpacked from the windowing operating system image to corresponding predetermined locations in the runtime memory.

15. The computing device of claim 14, wherein, once the sub-portions of the kernel archive are written into the runtime memory, a set of arguments and run-time variables, along with process control, are passed to the kernel archive as the kernel archive is executed by the processor.

16. The computing device of claim 15, wherein an initialization record is used to pass the set of arguments and run-time variables to the kernel archive, which is loaded in the runtime memory.

17. The computing device of claim 14, wherein the initialization module is configured to send the read request for the operating system to the external memory media via the external interface if the initialization module detects a valid boot signature at the external location of the external memory media.

18. The computing device of claim 17, wherein the initialization module obtains memory geometry information of the external memory media and then uses the geometry information to set a memory address location in the read request, which is sent to the external memory media to obtain the windowing operating system image.

19. A method for booting a computing device with a windowing operating system obtained from an external memory media via an external interface, the method comprising the steps of:

establishing a data connection through the external interface to an external location of the external memory media, the external memory media storing a boot agent module and a windowing operating system image at the external location;

sending a boot request from the computing device to the external memory media via the data connection;

receiving the boot agent module from the external memory media via the data connection in response to the boot request;

loading the boot agent module into a runtime memory in the computing device and executing the boot agent module with a processor in the computing device;

sending an operating system request from the boot agent module to the external memory media via the data connection, the operating system request including a memory address location based on a memory geometry information of the external memory media;

receiving, in response to the operating system request from the boot agent module, the windowing operating system image from the external memory media via the data connection; and loading the windowing operating system image into the runtime memory and executing the windowing operating system image with the processor.

20. The method of claim 19, wherein the establishment of the data connection is initiated by a start-up operation of the computing device.

21. The method of claim 19, wherein the data connection through the external interface to the external location in the external memory media is established by a DHCP request from the computing device via the external interface to a server in which the external memory media is disposed.

22. The method of claim 21, wherein the external interface is configured based on a response to the DHCP request from the server, and the connection is established by using connection information received from the server in response to a DHCP event sent from the computing device via the external interface to the server.

23. The method of claim 19, wherein the boot agent module and the windowing operating system image are received from the external location via the data connection through the external interface by using a standard connection protocol.

24. The method of claim 23, wherein the external interface is a network interface and the standard connection protocol is the internet protocol.

25. The method of claim 19, wherein the windowing operating system image is loaded into the runtime memory by unpacking the windowing operating system image in accordance with a predetermined rule set, and writing particular sub-portions of a kernel archive unpacked from the windowing operating system image to corresponding predetermined locations in the runtime memory.

26. The method of claim 25, wherein, once the sub-portions of the kernel archive are written into the runtime memory, a set of arguments and run-time variables, along with process control, are passed to the kernel archive as the kernel archive is executed by the processor.

27. The method of claim 26, wherein an initialization record is used to pass the set of arguments and run-time variables to the kernel archive, which is loaded in runtime memory.

28. The method of claim 19, wherein the operating system request is sent to the external memory media if a valid boot signature is detected at the external location of the external memory media.

29. The method of claim 28, wherein the memory geometry information of the external memory media is obtained by the computing device and then used to set the memory address location in the operating system request.

30. Computer-executable process steps stored on a computer readable medium, said computer-executable process steps for booting a computing device with a windowing operating system obtained from an external memory media through an interface disposed in the computing device, said computer-executable process steps comprising process steps executable to perform a method according to any of claims 19 to 29.

31. The method of claim 19, wherein the external memory media is disposed in an external serial device.

32. The method of claim 31, wherein the external interface is a serial interface.

33. The method of claim 32, wherein the data connection is a serial data connection.

* * * * *

UNITED STATES PATENT AND TRADEMARK OFFICE
CERTIFICATE OF CORRECTION

PATENT NO. : 7,631,173 B2  Page 1 of 1
APPLICATION NO. : 11/074876
DATED : December 8, 2009
INVENTOR(S) : Andrew T. Fausak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this

Twenty-first Day of December, 2010

David J. Kappos
*Director of the United States Patent and Trademark Office*